United States Patent
Wilson

(10) Patent No.: US 7,116,081 B2
(45) Date of Patent: Oct. 3, 2006

(54) THERMAL PROTECTION SCHEME FOR HIGH OUTPUT VEHICLE ALTERNATOR

(75) Inventor: Scott Richard Wilson, Novi, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 76 days.

(21) Appl. No.: 10/427,828

(22) Filed: May 1, 2003

(65) Prior Publication Data

US 2004/0217740 A1  Nov. 4, 2004

(51) Int. Cl.
*H02H 7/06* (2006.01)
*H02P 9/00* (2006.01)
*H02P 11/00* (2006.01)
*H02K 11/00* (2006.01)

(52) U.S. Cl. .................. 322/33; 322/28; 310/68 C
(58) Field of Classification Search ............... 322/33, 322/34, 19, 28; 361/120; 310/68 C, 67 R
See application file for complete search history.

(56) References Cited

U.S. PATENT DOCUMENTS

| | | | | |
|---|---|---|---|---|
| 3,817,226 A | * | 6/1974 | Wakamatsu et al. ......... | 123/485 |
| 3,919,623 A | * | 11/1975 | Reuther ....................... | 322/15 |
| 4,128,800 A | * | 12/1978 | Scott et al. .................... | 322/28 |
| 4,385,270 A | * | 5/1983 | Balan et al. ................... | 322/23 |
| 5,198,744 A | * | 3/1993 | Kohl et al. .................... | 322/33 |
| 5,227,703 A | * | 7/1993 | Boothe et al. ............... | 318/139 |
| 5,298,842 A | | 3/1994 | Vanek et al. ................. | 318/473 |
| 5,374,886 A | | 12/1994 | Kohl et al. .................... | 322/28 |
| 5,497,071 A | * | 3/1996 | Iwatani et al. ................ | 322/28 |
| 5,506,492 A | | 4/1996 | Harris ........................... | 322/28 |
| 5,548,202 A | * | 8/1996 | Schramm et al. ............. | 322/33 |
| 5,681,495 A | * | 10/1997 | Tsuchiya et al. ............. | 219/506 |
| 5,726,559 A | | 3/1998 | Taniguchi et al. ............. | 322/34 |
| 5,907,233 A | * | 5/1999 | Jabaji ........................... | 322/28 |
| 5,986,439 A | * | 11/1999 | Pletta et al. ................... | 322/59 |
| 6,049,196 A | | 4/2000 | Arai et al. ..................... | 322/61 |
| 6,081,084 A | | 6/2000 | Crecelius ...................... | 318/254 |
| 6,087,753 A | * | 7/2000 | Pinkerton ..................... | 310/178 |
| 6,184,661 B1 | * | 2/2001 | Becker et al. ................. | 322/25 |
| 6,222,349 B1 | * | 4/2001 | LeRow et al. ................. | 322/34 |
| 6,338,026 B1 | | 1/2002 | Hofmann et al. ............. | 702/64 |
| 6,414,832 B1 | | 7/2002 | Crecelius et al. ............ | 361/120 |
| 6,700,214 B1 | * | 3/2004 | Ulinski et al. ............. | 290/40 C |
| 6,809,428 B1 | * | 10/2004 | Blackburn et al. ......... | 290/37 R |

FOREIGN PATENT DOCUMENTS

JP    10323093    12/1998

OTHER PUBLICATIONS

Patents Act 1977: Search Report Under Section 17 dated Aug. 18, 2004.

* cited by examiner

*Primary Examiner*—Julio C. Gonzalez
(74) *Attorney, Agent, or Firm*—Dickinson Wright PLLC

(57) ABSTRACT

A system and a method for thermally protecting a high output vehicle alternator are provided. The high output vehicle alternator includes a duty cycle control system. The duty cycle control system includes an alternator temperature signal generator and an alternator rotor speed signal generator in communication with an alternator having a speed limit and a temperature limit. The duty cycle control system regulates the field current supplied to the alternator based on the temperature and rotor speed signals.

20 Claims, 2 Drawing Sheets

THERMAL PROTECTION SCHEME FOR HIGH OUTPUT VEHICLE ALTERNATOR

FIELD OF THE INVENTION

The present invention generally relates to automotive alternators. In particular, the present invention relates to thermal protection for high output vehicle alternators.

BACKGROUND OF THE INVENTION

A fundamental design goal for a vehicle alternator is to provide maximum power output at the lowest possible rotational speed. Additionally, smaller engine compartments in current vehicles require small alternator size combined with high efficiency. The highly efficient alternators generate high output at low speed, but generate more energy than can be consumed when the vehicle alternator operates at a higher rotational speed. In addition to generating electrical power, the alternator also generates heat. As the rotational speed of the alternator increases, the amount of heat increases, creating a potential failure of the alternator due to the elevated temperatures.

In order to dissipate heat, the alternator is provided with a cooling system. Liquid cooling has been used to help decrease excess heat. Liquid cooling dissipates the heat and provides a means of sealing the alternator's components for increased environmental robustness. However, liquid cooling may not be sufficient to dissipate heat at high alternator output levels. A machine designed to provide maximum output demand at low speed may exceed its thermal limit at high speed.

Air cooling systems also exist to help dissipate heat generated by an alternator. Similar to the liquid cooling systems, the air cooling systems cannot sufficiently cool the alternator at high output levels to prevent potential alternator failure due to excess heat generated during high speed alternator operation.

An additional problem exists with the temperature regulation of an alternator. The alternator itself has a large thermal capacity such that a temperature sensor may not adequately indicate increasing alternator temperature at the time the increase is actually occurring. By the time a temperature sensor indicates that the alternator has reached the thermal limit, the response time necessary to effect a decrease in temperature may be greater than the time required for sufficient cooling to prevent damage to the alternator. Temperature measurement alone is not sufficient to maintain the alternator at a thermally safe operating temperature and thereby prevent alternator failure due to excessive heating of the alternator during high speed operation.

Therefore, a need exists for providing a means for protecting a high output vehicle alternator from damage due to excessive heat.

BRIEF SUMMARY OF THE INVENTION

In order to alleviate one or more shortcomings of the prior art, a thermal protection system and method are provided herein. In accordance with the present invention, a thermal protection system and method are disclosed herein for thermal protection of a high output vehicle alternator.

According to one aspect of the present invention, there is provided a system for thermal protection of a high output vehicle alternator. The system comprises an alternator having a temperature limit and a rotor speed limit, a field current supply to the alternator, an alternator rotor speed signal generator, an alternator temperature signal generator and a duty cycle control system operably connected to the alternator and the signal generators. The duty cycle control system regulates the field current supply to the alternator based on the information from the signal generators.

In another aspect of the present invention, a method for thermally protecting a high output vehicle alternator is provided. The method includes the steps of determining an operating temperature for an alternator, comparing the operating temperature to a pre-determined alternator temperature limit and providing a temperature comparison signal to the duty cycle control system corresponding to the temperature comparison, determining an operating alternator rotor speed, comparing the rotor speed to a pre-determined rotor speed limit and providing a rotor speed comparison signal to the duty cycle control system indicative of the rotor speed comparison, and generating a duty cycle control signal to regulate a field current supply to the alternator based on the temperature comparison signal and the rotor speed comparison signal.

Advantages of the present invention will become more apparent to those skilled in the art from the following description of the preferred embodiments of the invention which have been shown and described by way of illustration. As will be realized, the invention is capable of other and different embodiments, and its details are capable of modification in various respects. Accordingly, the drawings and description are to be regarded as illustrative in nature and not as restrictive.

DETAILED DESCRIPTION OF THE INVENTION

Figure 1:
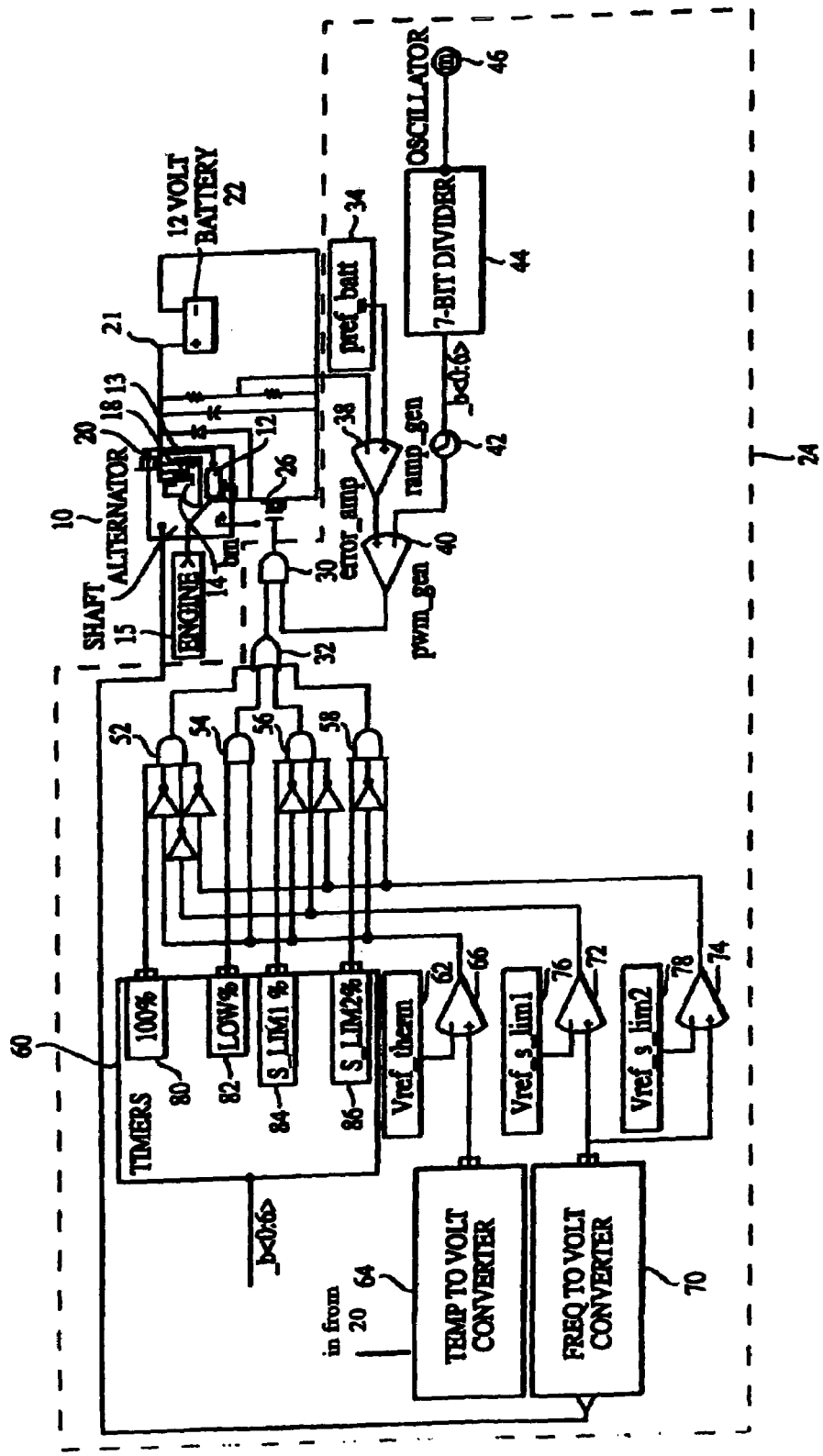
FIG. 1 is a schematic diagram of an electrical circuit for a preferred embodiment of the present invention.

An exemplary thermal protection system for use with a high output vehicle alternator that can be implemented in the present embodiment of the invention is shown in the schematic diagram of FIG. 1. An exemplary schematic high output vehicle alternator 10 is shown in this embodiment. The alternator 10 may be a Lundell type alternator, although any alternator commonly known in the art may be used with the present thermal protection system. As shown, the alternator 10 includes a rotor 12 inductively coupled to a stator 13 with stator windings 14. The rotor 12 is driven by a vehicle engine 15. The rotor 12 spins within the stator windings 14 to create three alternating currents. The three phase-alternating currents from the stator windings 14 are then rectified into direct current by a rectifier 18, preferably consisting of six diodes as is well-known in the art. The direct current is then supplied to a positive pole 21 of a battery 22. The battery 22 is preferably a 12 volt battery.

A field current is supplied through a voltage regulator 24 to the rotor 12 from the battery 22 or the rectifier 18. As shown in FIG. 1, a MOSFET switch 26 controls the voltage across the regulator 24. Any type of switch, such as a Darlington switch or a relay switch, commonly known in the art, may be used to control the voltage across the regulator 24 to the rotor 12. The voltage regulator 24 as shown in this embodiment of the present invention illustrates the thermal protection scheme for limiting a duty cycle to limit the field current supplied to the alternator 10 when an alternator temperature limit or a rotor speed limit (described below) has been reached.

An AND gate 30 and an OR gate 32 form a logic circuit for generating a signal for controlling the MOSFET 26. The reference voltage generating circuit of the AND gate 30 includes a battery reference 34, an error amplifier 38, a comparator 40 and a ramp generator 42. The battery reference 34 provides a reference standard for the battery 22, preferably in the range of 13–15 volts, most preferably in the range of 14.1–14.2 volts. The battery reference standard 34 is compared to an actual voltage level of the battery 22 in the error amplifier 38. The error amplifier 38 connects to the comparator 40 wherein a pulse width modulator (PWM) is formed. The ramp generator 42 provides a ramp signal to the comparator 40 to provide a ramp signal of constant frequency and shape. In this embodiment, the ramp signal may be digitally generated by a 7-bit divider 44 connected to an oscillator 46. The oscillator 46 frequency, in the preferred embodiment, is about 16 kHz. The ramp generator 42 provides a reference to the comparator 40. The ramp generator 42 reference signal is compared to the error amplifier 38 signal at the comparator 40. A PWM control signal from the comparator 40 that determines the duty cycle for the field current supplied to the rotor 12 through the regulator 24 is sent to the AND gate 30 and input with the signal from the OR gate 32. From the AND gate 30, a signal is transmitted to the MOSFET 26 to turn the MOSFET 26 on or off.

As described above, the AND gate 30 receives signals from the comparator 40 for reference and from the OR gate 32 for actual alternator operation. A plurality of AND gates 52–58 transmit signals to the OR gate 32. A set of continuous signals is sent from timers 60 to each of the AND gates 52–58 as described below. The timers 60 provide a signal reflecting the duty cycle limit required based on the temperature of the alternator 10 or the speed of the rotor 12 and the temperature of the alternator 10. Output from the 7-bit divider circuit 44 is transmitted to the timers 60. Based on the signal sent to OR gate 32 input with the reference PWM signal from comparator 40, the regulator 24 regulates whether to override the reference from comparator 40 that allows 100% duty cycle or whether to decrease the duty cycle based on an algorithm, described below, when the temperature or rotor speed signals indicate that a limit requiring thermal protection has been reached by the alternator.

A reference temperature 62 is determined for a specific alternator 10. For each type of alternator used, a maximum operating temperature limit for the alternator 10 may be experimentally determined to provide a temperature limit above which the alternator may be subject to damage or failure due to excessive heat exposure. For example, in a liquid-cooled alternator, a maximum operating temperature limit for the alternator may be determined by running the alternator at a speed at which excess heat is generated and until the alternator is damaged due to the excess heat generated during operation. The maximum safe operating temperature may be set at a range just below the temperature range at which the alternator incurs damage from the excess heat generated during operation. The maximum operating temperature limit is typically in the range of about 140° C. to about 170° C., more preferably about 145° C. to about 155° C., most preferably about 150° C. Of course, the maximum temperature limit set for an alternator depends on the specific type of alternator used. The maximum temperature limit may be any temperature limit that protects an alternator from damage or failure.

An alternator temperature signal 64 is generated from a temperature sensor 20 on alternator 10. The alternator temperature 64 may be monitored by a temperature sensor 79 placed at various points on the alternator and the signal 64 is generated while the alternator is operating. In a preferred embodiment, a temperature sensor may be placed within the voltage regulator, alternatively the temperature sensor may be placed inside the alternator on the rotor 12 or the stator windings 14. A temperature sensor may also be placed on the exterior of the alternator for ease of placement. Although interior placement of a temperature sensor may provide a measurement of the highest temperature in the alternator, interior placement of the temperature sensor is not critical. For example, a thermistor placed on the exterior of the alternator may be used to indicate alternator temperature. Any temperature sensor, combination of sensors, and sensor placement to monitor alternator temperature commonly known in the art may be used to detect the alternator temperature. The temperature of the alternator 10 is converted to voltage to supply the alternator temperature signal 64. The alternator temperature signal 64 is input with the alternator reference temperature 62 at a comparator 66. A signal from the comparator 66 is input to the AND gates 52–58.

A rotor speed signal 70 is generated from the conversion of the stator winding 14 frequency to voltage to reflect the speed of the rotor 12. The rotor speed signal 70 is supplied to a comparator 72 and a comparator 74. The comparator 72 compares the rotor speed signal 70 with a first rotor speed limit 76. A signal from comparator 72 is input to the AND gates 52 and 56. The comparator 74 compares the rotor speed signal 70 with a second rotor speed limit 78. A signal from comparator 74 is input to the AND gates 52, 56, and 58. The rotor speed limits are described in detail in the description of the algorithm below.

Signals are generated in the AND gates 52–58 as follows. For the AND gate 52, the timer 60 signal representing a 100% duty cycle 80 is input with the inverted signals from the comparators 66, 72, and 74. The 100% duty cycle 80 represents the maximum allowable regulator field drive duty cycle for a specific alternator. Therefore, the AND gate 52 transmits a signal to the OR gate 32 for 100% duty cycle if a) the temperature signal 64 is not greater than the reference temperature 62; and b) the rotor speed signal 70 is not greater than the first speed limit 76; and c) the rotor speed signal 70 is not greater than the second speed limit 78.

For the AND gate 54, the timer 60 signal representing a default maximum duty cycle limit 82 is input with the temperature comparator signal 66. The default maximum allowable duty cycle is any duty cycle that is low enough for the alternator not to produce excessive temperature. For example, the duty cycle may be reduced to 20% to still provide alternator output, but not generate excess heat. Alternatively, the duty cycle may be reduced to 0% to disable voltage regulation to prevent excess heating. Of course, other duty cycle limit reductions may be used when the operating temperature of the alternator exceeds the maximum allowable temperature limit. The AND gate 54 transmits a signal to the OR gate 32 for the default maximum duty cycle limit 82 when the temperature signal 64 is greater than the reference temperature 62.

For the AND gate 56, the timer 60 signal representing a first duty cycle limit 84 is input with the comparator signal 72 and inverted signals from the comparators 66 and 74. The duty cycle limits represent a limit on the field current supply to the alternator that is set when the alternator rotor speed reaches a certain speed. The rotor speeds and the duty cycle limits are described below in detail in the description of the algorithm for the preferred embodiment of the present invention. Therefore, the AND gate 56 transmits a signal to the OR gate 32 for the first duty cycle limit 84 if a) the temperature signal 64 is not greater that the reference temperature 62 and b) the rotor speed signal 70 is greater than the first speed limit 76 and c) the rotor speed signal 70 is not greater than the second speed limit 78.

For the AND gate 58, the timer 60 signal representing a second duty cycle limit 86 is input with the inverted signal from the comparator 66 and the signal from comparator 74. Therefore, the AND gate 58 transmits a signal to the OR gate 32 for the second duty cycle limit 86 if a) the temperature signal 64 is not greater that the reference temperature 62; and b) the rotor speed signal 70 is greater than the second speed limit 78.

Figure 2:
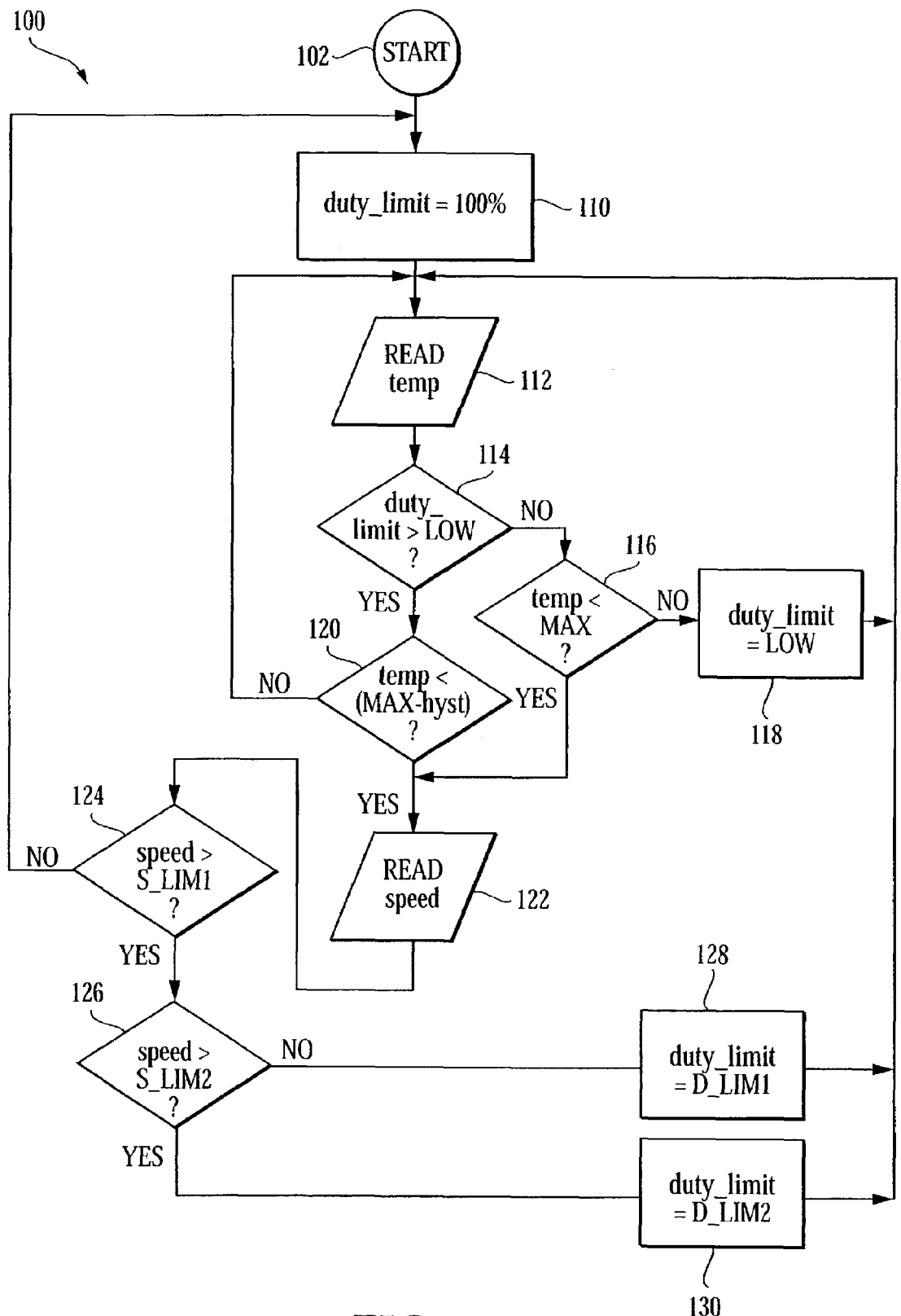
FIG. 2 is a logic flow diagram illustrating a preferred embodiment of a thermal protection scheme in accordance with an embodiment of the in accordance with another embodiment of the present invention.

The logic flow chart diagramed in FIG. 2 shows a preferred implementation of the controller steps of the regulator shown in FIG. 1 and preformed by the thermal protection algorithm 100 of the duty cycle control system.

The thermal protection algorithm 100 is initiated at 102, after a vehicle engine has been turned on. The algorithm 100 continues to run through a logic loop to monitor temperature changes and duty cycle limit changes as described below. Therefore, the algorithm may signal changes to the duty cycle controller to immediately change the duty cycle in response to excess alternator temperature or excess rotor speed.

In the algorithm 100, a vehicle starts at 102 and a duty cycle of 100% begins at 110. The 100% duty cycle 110 represents the maximum allowable regulator field drive duty cycle for a specific alternator. From the starting 100% duty cycle limit 110, a temperature determination 112 for the alternator is made. As described above, any temperature sensing means known in the art may be used to determine the temperature of the alternator while the alternator is operating. From the temperature determination 112, the algorithm continues to a determination of whether a duty cycle limit 114 has been invoked. The duty cycle limit 114 indicates that the duty cycle is less than the 100% of the duty cycle 110.

The thermal protection algorithm 100 decreases the maximum allowable duty cycle from the 100% duty cycle 110 to a default maximum allowable duty cycle when the temperature determination 112 indicates that the operating temperature exceeds a maximum operating temperature limit determined for a specific alternator, described at step 116. The default maximum allowable duty cycle is any duty cycle that is low enough for the alternator not to produce excessive temperature as described above. If the duty cycle limit 114 is not less than the 100% duty cycle limit 110 indicating that the duty cycle is operating at the maximum allowable duty cycle, the algorithm determines whether the temperature determination 112 is less than a maximum temperature limit determined for a specific alternator at step 116. In a preferred embodiment, using a Lundell type alternator, the maximum temperature limit may be in the range of about 145–155° C., more preferably about 150° C.

If the temperature 112 is greater than the maximum temperature limit 116, the algorithm continues to set a duty cycle limit reduction 118. The duty cycle limit 118 is set to the default maximum allowable duty cycle as described above at step 114 and the algorithm returns to the temperature determination 112.

If the temperature 116 is below the maximum determined temperature, an alternator rotor speed 122 is determined. The rotor speed 122 is compared to a first speed limit 124. In a preferred embodiment, a first rotor speed limit may be set to limit generation of excess heat production by the alternator before the alternator temperature exceeds the maximum temperature limit 116. In the present embodiment, a first rotor speed limit may be set at about 2500 rpm. Of course, other rotor speed limits are possible to set and still provide thermal protection for an alternator. If the rotor speed 122 is below the first speed limit 124, the algorithm returns to 110 and the duty limit for the field drive duty cycle is reset to 100%.

If the rotor speed 122 exceeds the first speed limit 124, the rotor speed 122 is compared to a second rotor speed limit 126. In a preferred embodiment, a second rotor speed limit 126 may be determined for a specific alternator to be set at about 5000 rpm. When the rotor speed 122 is below the second rotor speed limit 126, a first duty cycle limit 128 is set. The first duty cycle limit 128 may be determined experimentally by comparing the temperature of the alternator to the speed of the rotor and determining the reduction necessary in the duty cycle at the first rotor speed limit 124 that prevents the specific alternator from exceeding the maximum temperature limit. In a preferred embodiment, as described above with the maximum temperature for the specific alternator set at 150° C., the first speed limit 124 of about 2500 rpm, the first duty cycle limit 128 for the field drive duty cycle may be set at about 90%. The algorithm returns to 112 and the alternator temperature 112 is determined.

If the speed 122 exceeds the second rotor speed limit 126, a second duty cycle limit 130 is set. As described for the first duty cycle limit 128, each duty cycle limit is alternator specific. In this preferred embodiment, the second duty cycle limit 130 for the field drive duty cycle may be set at about 80%. The algorithm returns to 112 and the alternator temperature 112 is determined.

If the duty cycle limit 114 is operating at the maximum allowable duty cycle when the operating temperature exceeds the threshold temperature, the temperature 112 is compared to the maximum temperature, described at 116, minus a hysteresis temperature 120 reflecting the lagging in the values of the temperature 112 resulting from the alternator's thermal capacity. In the preferred embodiment described herein with a maximum temperature for the specific alternator of about 150° C., the hysteresis temperature is preferably set at about 15° C. If the temperature 112 is below the maximum determined temperature minus the hysteresis temperature 120, the rotor speed 122 is determined and the algorithm continues as described above. If the temperature 112 is above the maximum determined temperature minus the hysteresis temperature 120, the algorithm returns to determine the temperature 112.

Of course, a duty cycle control system may be implemented using a different number of temperature limits, rotor speed limits and duty cycle limits. Alternatively, the duty cycle control system may be implemented on a point by point temperature and rotor speed determination using a microprocessor.

Although the invention herein has been described in connection with a preferred embodiment thereof, it will be appreciated by those skilled in the art that additions, modifications, substitutions, and deletions not specifically described may be made without departing from the spirit and scope of the invention as defined in the appended claims. The scope of the invention is defined by the appended claims, and all devices that come within the meaning of the claims, either literally or by equivalence, are intended to be embraced therein.

The invention claimed is:

1. A thermal protection system for a high output vehicle alternator, said system comprising:
   a duty cycle control system;
   an alternator having a temperature limit and at least one rotor speed limit, said alternator operably connected to said duty cycle control system;
   a field current supply to said alternator;
   an alternator rotor speed sensor in communication with said duty cycle control system for determining an alternator rotor speed; and
   an alternator temperature sensor in communication with said duty cycle control system, for determining an alternator temperature, wherein said duty cycle control system regulates said field current supply to said alternator based on said alternator rotor speed and said alternator temperature in order to maintain said alternator temperature below said temperature limit and prevent excess heat from being generated.

2. The thermal protection system of claim 1 wherein said duty cycle control system stores and runs at least one algorithm for regulating the field current supply to said alternator.

3. The thermal protection system of claim 2 wherein the at least one algorithm further regulates the field current supply by providing at least one duty cycle limit.

4. The thermal protection system of claim 3 wherein said at least one duty cycle limit is based on said alternator temperature exceeding the temperature limit.

5. The thermal protection system of claim 3 wherein said at least one duty cycle limit is based on said alternator rotor speed exceeding said at least one rotor speed limit.

6. The thermal protection system of claim 1 wherein said temperature limit is in the range from about 140° C. about 160° C.

7. The thermal protection system of claim 3 wherein said duty cycle limit is in the range from about 0% to about 90%.

8. The thermal protection system of claim 1 wherein said alternator further comprises a liquid cooled alternator.

9. The thermal protection system of claim 1 wherein said alternator temperature sensor further comprises a thermistor.

10. A method for thermally protecting a high output vehicle alternator, said alternator being operably connected to a duty cycle control system, said method comprising the steps of:
    determining an operating temperature for said alternator;
    comparing said operating temperature to a predetermined alternator temperature limit and providing a temperature comparison signal to said duty cycle control system corresponding to said comparison;
    determining an operating alternator rotor speed;
    comparing said rotor speed to a pre-determined rotor speed limit and providing a rotor speed comparison signal to said duty cycle control system corresponding to said comparison;
    generating a duty cycle control signal to regulate a field current supply to said alternator based on said temperature comparison signal and said rotor speed comparison signal in order to maintain said alternator temperature below said pre-determined alternator temperature limit and prevent excess heat from being generated by said alternator.

11. The method of claim 10 wherein generating said duty cycle control signal further comprises the step of using at least one algorithm for generating said duty cycle control signal.

12. The method of claim 11 wherein said at least one algorithm further comprises the step of providing at least one duty cycle limit.

13. The method of claim 12 further comprising the step of providing said at least one duty cycle limit based on said alternator temperature exceeding the temperature limit.

14. The method of claim 12 further comprising the step of providing said at least one duty cycle limit based on said alternator rotor speed exceeding said at least one rotor speed limit.

15. The method of claim 10 wherein the step of determining said temperature limit further comprises providing a temperature limit in the range from about 140° C. to about 160° C.

16. The method of claim 12 wherein said at least one duty cycle limit ranges from about 0% to about 90%.

17. A thermal protection system for a high output vehicle alternator, said alternator being operatively connected to a duty cycle control system, said thermal protection system comprising:
    means for determining an operating temperature for said alternator;
    means for comparing said operating temperature to a pre-determined alternator temperature limit and providing a temperature signal corresponding to said comparison;
    means for determining an operating alternator rotor speed;
    means for comparing said rotor speed to a pre-determined rotor speed limit and providing a rotor speed signal corresponding to said comparison;
    means, in communication with said means for comparing said indicative temperature signal and said means for comparing said indicative rotor speeds, for generating a duty cycle control signal based on said temperature comparison signal and said rotor speed comparison signal, and sending said duty cycle control signal to said duty cycle control system to regulate a field current supply to said alternator such that said operating temperature is maintained below said pre-determined alternator temperature limit and excess heat is not being generated.

18. The thermal protection system for a high output vehicle alternator of claim 1, wherein said duty cycle control system regulates said field current supply to said alternator to prevent excess heat from being generated by comparing said alternator rotor speed to said at least one rotor speed limit.

19. The thermal protection system for a high output vehicle alternator of claim 18, wherein said alternator has a second rotor speed limit and wherein said duty cycle control system regulates said field current supply to said alternator to prevent excess heat from being generated by comparing said alternator rotor speed to said second rotor speed limit.

20. The thermal protection system for a high output vehicle alternator of claim 19, wherein said duty cycle control system regulates said field current supply to said alternator to prevent excess heat from being generated when said alternator temperature is below said temperature limit.

* * * * *

UNITED STATES PATENT AND TRADEMARK OFFICE
CERTIFICATE OF CORRECTION

PATENT NO. : 7,116,081 B2 Page 1 of 1
APPLICATION NO. : 10/427828
DATED : October 3, 2006
INVENTOR(S) : Scott Richard Wilson It is certified that error appears in the above-identified patent and that said Letters Patent is hereby corrected as shown below:

Column 4, line 6, after "sensor" delete "79".

Signed and Sealed this

Thirteenth Day of March, 2007

JON W. DUDAS
*Director of the United States Patent and Trademark Office*